United States Patent [19]

Alford et al.

[11] 4,141,826

[45] Feb. 27, 1979

[54] TREATMENT OF ACRYLONITRILE WASTE WATER WITH ACTIVATED CARBON

[75] Inventors: Harvey E. Alford, Amherst; Kenneth L. Bigler, Aurora, both of Ohio

[73] Assignee: The Standard Oil Company, Cleveland, Ohio

[21] Appl. No.: 782,801

[22] Filed: Mar. 30, 1977

[51] Int. Cl.² ............................................. C02C 5/02
[52] U.S. Cl. ....................................... 210/26; 210/32; 210/33; 210/34; 210/40; 260/465.9; 562/600
[58] Field of Search .................... 210/26, 27, 30 R, 32, 210/34, 40, 33; 252/414, 416, 417–419; 260/465.9, 526 N

[56] References Cited

U.S. PATENT DOCUMENTS

| | | | |
|---|---|---|---|
| 3,244,621 | 4/1966 | Bouthilet | 210/40 |
| 3,448,042 | 6/1969 | Mattia et al. | 210/40 |
| 3,625,886 | 12/1971 | Mattia | 210/40 |
| 3,636,067 | 1/1972 | Lovett et al. | 260/465.9 |
| 3,734,943 | 5/1973 | Fitzgibbons et al. | 260/465.9 |
| 3,870,746 | 3/1975 | Lussling et al. | 260/465.9 |
| 3,965,036 | 6/1976 | Himmelstein | 210/40 |

FOREIGN PATENT DOCUMENTS 2549707  5/1976  Fed. Rep. of Germany .......... 252/414

Primary Examiner—Charles N. Hart
Assistant Examiner—Ivars Cintins
Attorney, Agent, or Firm—Herbert D. Knudsen; John E. Miller, Jr.

[57] ABSTRACT

Waste water produced in an acrylonitrile plant and containing significant amounts of acrylonitrile and acrylic acid is processed so as to reduce its organics content for disposal purposes and to recover the acrylonitrile and acrylic acid contained therein. The waste water is treated by contact with activated carbon to adsorb the organics contained therein. The activated carbon is periodicaly regenerated with a desorbing liquid and the desorbate product is distilled to yield acrylonitrile and acrylic acid. Every fifth regeneration cycle, the activated carbon is regenerated thermally rather than means of a liquid in order to restore its activity to its original value.

9 Claims, 1 Drawing Figure

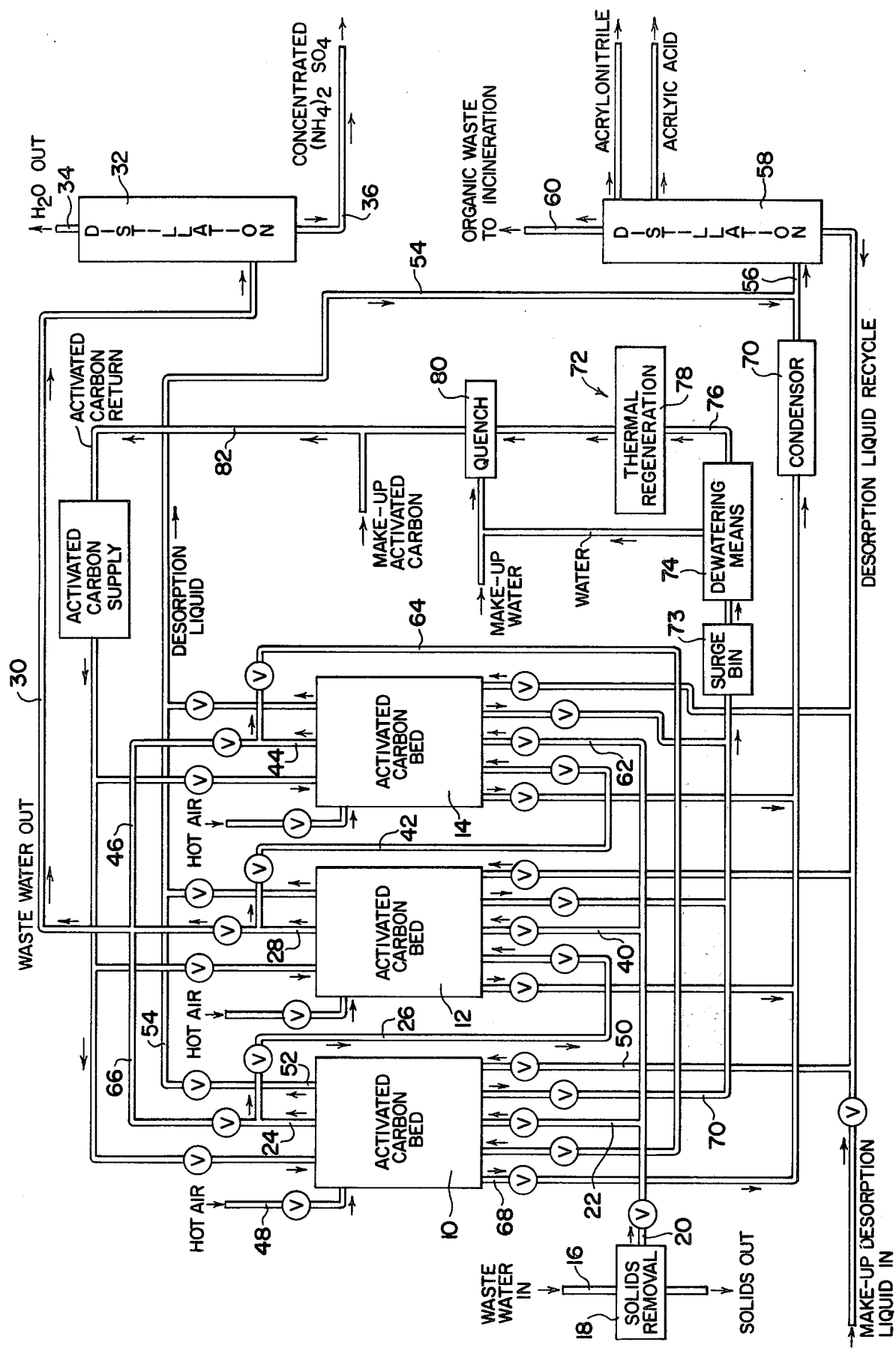

TREATMENT OF ACRYLONITRILE WASTE WATER WITH ACTIVATED CARBON

BACKGROUND OF THE INVENTION

The present invention relates to a novel technique for disposing of waste water streams produced by acrylonitrile-manufacturing plants. More particularly, the present invention relates to a novel technique for treating waste water streams produced in acrylonitrile-manufacturing plants so as to recover some of the valuable components therein and simultaneously make the waste water sufficiently free of ecology-damaging components so that it can be discharged to waste without damage to the environment.

In the manufacture of acrylonitrile by the single step vapor phase ammoxidation of propylene with ammonia and oxygen, a waste water stream containing various organic and inorganic components is produced (hereinafter referred to as "acrylonitrile waste water"). Typically, acrylonitrile waste water contains about 3% organics and about 97% aqueous phase on a solids-free basis. The aqueous phase is composed predominantly of water and contains 2.4% ammonium sulfate and ammonium bisulfate. A typical composition of the organics phase of acrylonitrile waste water is as follows:

| Component | Weight % |
| --- | --- |
| HCN | 9.6 |
| methanol | 0.1 |
| acetaldehyde | 2.1 |
| acetonitrile | 5.6 |
| acrolein | 2.9 |
| acrylontrile | 14.6 |
| acetic acid | 2.7 |
| propionitrile | 0.8 |
| acrylic acid | 47.7 |
| pyrazine, pyridine | 3.0 |
| trans-fumaronitrile | 3.1 |
| acrylamide | 3.3 |
| methyl pyridine | 2.1 |
| succinonitrile | 0.8 |
| cyanopyridine | 1.7 |

The composition of acrylonitrile waste water may vary somewhat from the foregoing. However, in general acrylonitrile waste water will always be composed predominantly of water and contain at least ammonium sulfate, acrylic acid and acrylonitrile. A number of techniques have already been adopted for disposing of this waste water stream. In some operations, the waste water is simply discharged as is into extremely deep wells. In other operations, the waste water is incinerated.

Neither of these waste water disposal techniques is satisfactory from a long-term standpoint. Extremely deep wells are expensive to drill, and moreover continued discharge of acrylonitrile waste water into such wells is ecologically unsatisfactory. Incineration on the other hand is also disadvantageous because the sulfates in the waste water are transformed into sulfur dioxide which itself presents a significant air pollution problem.

In order to deal with the problem of discharging waste water from an acrylonitrile-manufacturing plant, it has been proposed to distill the waste water in order to significantly reduce the volume of the material which must be discharged. Unfortunately, the organic components, especially the acrylonitrile and acrylic acid, in the waste water causes fouling of the apparatus used for distilling, and hence distillation is not a practical answer.

It has also been proposed to purify the waste water with activated carbon thereby yielding a waste water stream substantially free of organic components. This partially purified waste water stream can then be distilled without the fouling problem mentioned above, if desired. Unfortunately, periodic regeneration of the activated carbon by conventional thermal treatment causes a five to ten percent loss in the total amount of activated carbon used for each regeneration step. In view of the expense of activated carbon and the relatively large amounts of activated carbon necessary, the use of activated carbon in this matter is economically prohibitive.

Accordingly, it is an object of the present invention to provide a novel technique for treating waste water produced in an acrylonitrile-manufacturing plant so that it can be discharged to waste without significant adverse impact on the ecology.

It is a further object of the present invention to provide a method for treating the waste water produced in an acrylonitrile-manufacturing plant so as to recover some of the valuable components therein prior to discharge of the waste water so that the expense of the waste water treatment process can be reduced.

SUMMARY OF THE INVENTION

These and other objects are accomplished by the present invention in accordance with which waste water from an acrylonitrile-manufacturing plant is contacted with activated carbon in a series of activated carbon beds so that valuable organic components in the waste stream, e.g. acrylonitrile and acrylic acid, are adsorbed. Thereafter, the organic components retained in the activated carbon beds are recovered therefrom by desorbing with a suitable desorbing liquid having a boiling point higher than the organic components to be recovered. The desorbate produced by the desorption step is then distilled to produce substantially pure acrylonitrile and acrylic acid as a distillate product with the desorbing liquid being recovered as distillation bottoms which is recycled for reuse in a further desorption step. The waste water passing out of the activated carbon beds which is substantially free of the organic components originally contained therein can be distilled if desired without encountering the fouling problem associated with distilling raw acrylonitrile waste water so that the volume of waste water which must be discharged is significantly reduced. Adsorption and solvent desorption of the activated carbon beds is carried out cyclically until the adsorption capacity of the activated carbon drops below a predetermined value, normally about three or four cycles. Then, the activated carbon is thermally regenerated in a conventional manner so that the activity of the activated carbon is brought back to essentially its initial or virgin value. Because the activated carbon is thermally regenerated only every fourth or fifth cycle, loss of activated carbon through thermal regeneration is drastically reduced. Hence, the entire process can be carried out on an economically feasible basis.

Thus, the present invention provides a novel process for treating acrylonitrile waste water to facilitate disposal thereof and recover acrylonitrile and acrylic acid therefrom, the process in accordance with the present invention comprising (1) contacting acrylonitrile waste water with activated carbon to adsorb the organic components of the waste water thereon and produce acrylonitrile waste water having a reduced organic content, (2) liquid-regenerating the activated carbon after the capacity of the activated carbon to adsorb organics drops below a predetermined value to thereby produce a desorbing liquid rich in organics, (3) distilling the organics-rich generating liquid produced in step (2) to separate acrylic acid and acrylonitrile from the regenerating liquid, (4) repeating steps (1), (2), and (3) in order until liquid regeneration of the activated carbon is unable to restore the activity of the activated carbon to a predetermined percentage of its virgin activity, (5) thereafter contacting the activated carbon with additional amounts of acrylonitrile waste water to adsorb organics on the activated carbon, and then (6) thermally regenerating the activated carbon.

More specifically, the present invention provides a process for treating acrylonitrile waste water to facilitate disposal thereof and recover acrylonitrile and acrylic acid therefrom, the process comprising (1) adsorbing organics contained in the acrylonitrile waste water by passing the acrylonitrile waste water through first and second activated carbon beds arranged in series whereby the acrylonitrile waste water passing out of the second activated carbon bed has a reduced organics content, (2) thereafter liquid-regenerating the first activated carbon bed by passing a regenerating liquid having a boiling point higher than the organics in acrylonitrile waste water through the first activated carbon bed to desorb the organics contained therein and thereby produce an organics-rich regenerating liquid, the organics-rich regenerating liquid being distilled to produce acrylonitrile and acrylic acid as distillate and regenerating liquid as distillation bottoms, (3) simultaneously with step (2), adsorbing organics from additional amounts of acrylonitrile waste water by passing additional amounts of acrylonitrile waste water in series through the second activated carbon bed and then through a third activated carbon bed, (4) thereafter, liquid-regenerating the second activated carbon bed by passing regenerating liquid through the second activated carbon bed to desorb the organics contained therein and thereby produce an organics-rich regenerating liquid, the organics-rich regenerating liquid being distilled to produce acrylonitrile and acrylic acid as distillate and regenerating liquid as distillation bottoms, (5) simultaneously with step (4) adsorbing organics from additional amounts of acrylonitrile waste water by passing acrylonitrile waste water in series through the third activated carbon bed and then through the first activated carbon bed, (6) repeating steps (1) to (5) until each of the activated carbon beds is liquid regenerated at least three times, and thereafter separately and in sequence thermally regenerating each of the three activated carbon beds by passing the activated carbon therein to a thermal regeneration furnace and heating the activated carbon to an elevated temperature sufficient to burn off the organics thereon.

BRIEF DESCRIPTION OF THE DRAWINGS

The sole FIGURE is a schematic diagram illustrating the system employed to carry out inventive process.

DETAILED DESCRIPTION

The inventive process for treating waste water produced in an acrylonitrile-manufacturing plant is generally illustrated in the sole FIGURE. The system takes the form of three activated carbon beds 10, 12, and 14. Waste water is generally introduced into the system from source 16, and is subjected to solids removal in suitable apparatus 18 such as a centrifuge or filter to remove any solid material entrained in the waste water. The solids-free waste water passing out of solids removal apparatus 18 passes via conduits 20 and 22 to the bottom of activated carbon bed 10. Waste water flows upwardly through activated carbon bed 10, and then passes out of activated carbon bed 10 via conduits 24 and 26 to the bottom of activated carbon bed 12. Next the waste water passes upwardly through activated carbon bed 12, and then out of activated carbon bed 12 via conduits 28 and 30. From conduit 30 the waste water, now substantially completely purified of its organics content passes into distillation tower 32 where it is distilled to form water which is discharged through the top of the column 34 and a concentrated solution of ammonium sulfate and ammonium bisulfate which is taken from the bottom of the column 36 and discharged.

After a suitable period of operation, for example, 24 hours, the efficiency of the activated carbon in activated carbon bed 10 significantly decreases since it becomes "saturated" with organics. At this time, valving in system is adjusted so that waste water in conduit 20 flows directly to the bottom of activated carbon bed 12 via conduit 40. The waste water passing out of the top of activated carbon bed 12 is then transferred via conduits 28 and 42 to the bottom of activated bed 14. Waste water passing out of the top of activated carbon bed 14 is then transferred via conduits 44 and 46 to conduit 30 which in turn transfers the waste water to distillation column 32. The system is then operated in this manner for a predetermined period of time, for example 24 hours, with the waste water flowing in series first through activated carbon bed 12 and then through activated carbon bed 14 until activated carbon 12 becomes "saturated" with organics.

While activated carbon beds 12 and 14 are adsorbing organics from the waste water, activated carbon bed 10 is liquid-regenerated. This procedure is accomplished in the following manner. After the flow of waste water into the bottom of activated carbon bed 10 is stopped, the waste water remaining in activated carbon bed 10 is allowed to flow out of the bottom thereof through conduit 22 or other suitable conduit (not shown). Then, hot air above the boiling point of water, e.g. at 250° C., is introduced into the top of activated carbon bed 10 via conduit 48. This causes drying of the activated carbon in activated carbon 10 and hence prevents water from being taken up by the desorption liquid to be introduced into activated carbon bed 10 for removing the organics therefrom.

Once the activated carbon bed is dry, desorption liquid is fed to the bottom of activated carbon bed 10 via conduit 50. In activated carbon bed 10, the desorbing liquid causes desorption of the organics adsorbed on the activated carbon. The desorption liquid which contains the desorbed organics passes out of the top of activated carbon bed 10 via conduit 52 and is transferred via conduits 54 and 56 to distillation tower 58. Preferably, the desorption liquid has a boiling point higher than the organics to be recovered so that distillation causes the organics to be distilled with the desorption liquid at least partially purified being recovered as distillation bottoms. As shown in the FIGURE, acrylonitrile and acrylic acid are recovered from at or near the top of distillation column 58 while desorption liquid is recovered from the bottom. The desorption liquid is recycled to conduit 50 for another pass through activated carbon bed 10 while acrylonitrile and acrylic acid are recovered as valuable products. Organics other than acrylonitrile and acrylic acid are also recovered and these organics are sent via conduit 60 to incineration.

The system is operated with activated carbon bed 10 undergoing liquid regeneration and waste water being passed in series through activated carbon beds 12 and 14 for adsorption of organics for a predetermined period of time, e.g. 24 hours, until the activated carbon is activated carbon bed 12 becomes "saturated" with organics. At this time, the valving in the system is changed so that waste water is transferred directly to the bottom of activated carbon bed 14 via conduit 62 and the waste water passing out of activated carbon bed 14 is passed via conduits 44 and 64 to the bottom of activated carbon bed 10. Waste water passing out of activated carbon bed 10 is transferred via conduits 24 and 26 to conduit 30 which in turns transfers the waste water to distillation tower 32 for concentration.

Because of the expense of the desorption liquid, it is preferable to carry out the regeneration procedure so that the loss of the desorption liquid is as small as possible. To this end, shortly before activated carbon bed 10 is to be transferred from a regeneration mode to an adsorption mode, the flow of desorption liquid into activated carbon bed 10 is stopped and any desorption liquid remaining in activated carbon 10 is allowed to flow out of the bed through conduit 68, condensor 70 and conduit 56 to distillation column 58. Hot air, preferably at a temperature of about 400° F. is introduced into activated carbon bed 10 via conduit 48 for vaporizing any desorption liquid remaining therein. The hot air and desorption liquid vapors are passed via conduit 68 to condensor 70 where the desorption liquid vapors are condensed. The desorption liquid vapors and air are then passed into distillation column 58 for recovery.

The process as described above is repeated in a cyclical fashion with two of the activated carbon beds arranged in series being employed for adsorption of organics from the acrylonitrile waste water and the third activated carbon bed being regenerated during each cycle. After each cycle, the valving is changed so that in the next cycle the activated carbon bed having undergone regeneration in the previous cycle is the last bed in the series of beds receiving waste water while the bed undergoing regeneration in the next cycle is the first bed in the series of beds receiving waste water in the preceding cycle.

This cyclical operation continues until each bed is liquid regenerated at least three and preferably four times. Thereafter, each bed is regenerated in turn by thermal regeneration techniques instead of liquid regeneration techniques. It has been found that liquid regeneration techniques as employed in the inventive process although capable of removing substantial amounts of organics from the activated carbon will not regenerate the activated carbon back to its initial activity. With even the best desorption liquid, the adsorption capacity of activated carbon having undergone four adsorption/desorption cycles is only roughly 50% of its initial adsorption capacity. In accordance with the present invention, therefore, the adsorption beds are periodically subjected to thermal regeneration, preferably after every fourth adsorption/liquid desorption cycle.

In order to accomplish thermal regeneration of activated carbon bed 10, the flow of waste water into activated carbon bed 10 is stopped and residual waste water remaining in activated carbon bed 10 is drained therefrom in the manner indicated above. However, rather than drying activated carbon bed 10 with hot air and desorbing activated carbon bed 10 with a desorption liquid, the activated carbon in activated carbon bed 10 is removed and transferred via conduit 70 to a thermal regeneration system generally indicated as 72. Movement of activated carbon from bed 10 to thermal regeneration system 72 is accomplished in a conventional manner by dumping the activated carbon in bed 10 into conduit 70 and introducing water into conduit 70 so that an aqueous slurry of activated carbon is formed. The activated carbon slurry passes into surge bin 73 for holding wet activated carbon until it can be further processed and then into dewatering means 74 which is conventionally a vibrating screen for reducing the water content of the slurry. Activated carbon substantially freed of its water content is transferred via conduit 76 to thermal regeneration column 78 where it is heated to an elevated temperature in a conventional manner to restore the activity of the carbon to a virgin quality. Normally, this is accomplished by heating the activated carbon to a temperature of about 1500° F. to 1850° F. for a period of 0.25 to 2.0 hours. Steam may be added at a rate of about 1 pound per pound of carbon to aid in regeneration.

To prevent the carbon passing out of thermal regeneration column 78 which is at an elevated temperature, for example about 1600° F., from burning, the activated carbon is quenched with water in quenching means 80. Quenching the activated carbon in quenching means 80 also facilitates wetting of the pores of the dry activated carbon passing out of thermal regeneration column 78. Water for quenching is derived primarily from dewatering means 74 although make-up water may be added. After quenching, the activated carbon may be returned via conduit 82 to bed 10. Preferably, sufficient additional activated carbon is stored in quenching means 80 so that bed 10 (and each of the other beds when thermally regenerated) can be refilled with a full charge of activated carbon as soon as it is emptied of its previous charge. This allows the thermal regeneration procedure to be accomplished over a much longer period of time than one operating cycle and hence results in a great reduction in the size of the furnace necessary for thermal regeneration. When the system is designed in this manner, activated carbon derived from each bed which is regenerated in furnace 78 will be held in quenching means 80 and ultimately returned to the next bed for refilling of this activated carbon bed. In other words activated carbon removed from bed 10 will be refilled into bed 12 when bed 12 is thermally regenerated, and so forth.

Once activated carbon bed 10 is thermally regenerated, the valving in the system is changed so that waste water flows in series through activated carbon beds 14 and 10, respectively, and activated carbon bed 12 is thermally regenerated. Thermal regeneration of activated carbon bed 12 occurs in the same manner as discussed above in connection with activated carbon bed 10. Similarly, thermal regeneration of activated carbon bed 14, which occurs after waste water flows in series through activated carbon beds 10 and 12, also occurs in the same manner.

In accordance with the present invention, it has been found that the foregoing technique provides a valuable amount of acrylonitrile monomer and acrylic acid monomer which would otherwise be discharged to waste or incinerated if another disposal procedure were employed. The treatment procedure of the inventive process does involve a 5 to 10% loss of activated carbon each time the activated carbon beds are thermally regenerated. However, in accordance with the present invention, the activated carbon beds are regenerated only every fourth or fifth regeneration cycle. This reduces the amount of activated carbon loss to only 1 to 2% per regeneration. This significant savings in the amount of activated carbon loss, plus the additional economic advantage realized when significant amounts of acrylonitrile and acrylic acid monomer are recovered, makes the process as a whole commercially feasible. Also when the waste water coming off of the activated carbon beds is distilled in accordance with the preferred embodiment of the invention, a further advantage is realized in that the volume of sulfate-containing waste water to be disposed of is greatly reduced.

In order to liquid regenerate the activated carbon beds, any regeneration liquid can be used which is capable of adequately desorbing the adsorbed organics and which is essentially inert to the activated carbon and the organics. Desorption of organics adsorbed on activated carbon has been practiced for many years and those skilled in the art would have no trouble in selecting appropriate liquids. In accordance with the preferred embodiment of the present invention, however, the desorbing liquid has a boiling point higher than the organics in the acrylonitrile waste water, and at least higher than the boiling points of acrylonitrile monomer and acrylic acid monomer. Also, the regenerating liquid should have a capacity for regenerating activated carbon to at least about 90 percent of its virgin activity measured in terms of the activity of the activated carbon to adsorb carbon tetrachloride. Examples of liquids which have been found ideally suited for use of the regenerating liquid are isobutyric acid which has a boiling point of 163° C. and an activation capacity of 97.8 percent; dimethyl formamide which has a boiling point of 149° C. and a regeneration activity of 91.7 percent and dimethyl sulfoxide which has a boiling point of 189° C. and a regeneration activity of 89.5 percent. It is also possible in accordance with the present invention to employ liquids having a lower boiling point in which case one or more of the valuable components in the acrylonitrile waste water (acrylonitrile) may not be distilled off and hence not recovered. Examples of such solvents are acetic acid which has a boiling point of 118° C. and a regeneration activity of 93.4 percent and methylethyl ketone which has a boiling point of 80° C. and a regeneration activity of 92.8 percent. Finally, it is also possible in accordance with the present invention to employ a regeneration liquid which has a boiling point lower than the boiling point of the organic components to be recovered, in which case the regenerating liquid can be distilled off and recycled while the organics are recovered as distillation bottoms.

It should also be appreciated the techniques for thermally regenerating activated carbon which contains adsorbed organics are well known in the art, and any conventional technique can be employed. Those skilled in the art should have no difficulty in choosing appropriate temperature and time conditions for the thermal regeneration procedure.

In order to provide a better understanding of the present invention, the following preferred embodiment is described. In this embodiment, an acrylonitrile waste water treatment facility is designed for processing 1,804,500 pounds per day of acrylonitrile waste water.

For processing this waste water, three cylindrical columns each twenty feet in diameter and twenty-five feet high are selected. Each column contains 169,020 pounds of activated carbon. Thus, the total carbon charge, including that being regenerated, is 507,060 pounds. In addition, about 253,000 pounds of fresh carbon is provided for in inventory. The carbon depth in each column is approximately seventeen feet, the additional height of each column being required for bed expansion encountered in upflow operation. Suitable means for dispersing the liquid streams are placed at the bottom of each column. Each column is designed to be on stream for 48 hours and then regenerated for 24 hours. This adsorption system is capable of yielding about 1,750,000 pounds per day of organics-free liquid containing small amounts of ammonium sulfate and ammonium bisulfate.

In order to effect liquid regeneration, isobutyric acid is selected as the regenerating liquid. Since isobutyric acid forms an azeotrope with water, the water must be removed from each activated carbon bed prior to contact with the isobutyric acid. In the preferred embodiment, this is accmplished by blowing the column with hot air at about 250° F. Air flow is downward.

Liquid regeneration is to be carried out at 160° F. There is no need to cool the column prior to the introduction of the isobutyric acid. Solvent flow is upward, and the amount of solvent used is selected to be three times the weight of the carbon in the column.

Following liquid regeneration, the column is drained of any residual regenerating liquid. The drainings are saved and combined with material taken overhead. To minimize loss of regenerating liquid, the column is blown down with hot air at a temperature of about 400° F. The effluent vapors are condensed and added to the regenerating liquid recovered from the column. This regenerating liquid is then distilled at a temperature of 325° F. and the organics recovered while the solvent is recycled. Each tower is regenerated four times by this liquid regeneration procedure.

The distillation tower used for distilling the regeneration liquid has a capacity of slightly more than 438,000 pounds per day (about 39 g.p.m.). The regeneration liquid is distilled at a temperature of 325° F. (atmospheric equivalent) to yield about 5,800 pounds per day of acrylonitrile and 12,800 pounds per day of acrylic acid. About 16,000 pounds per day of other organics are produced and incinerated.

The regeneration furnace used for thermal regeneration must have a hearth area of at least 324 ft$^2$ in order to process all of the activated carbon in one bed in four days, the feed rate of activated carbon in this case being 3380 pounds per hour. The standard furnace of choice is a ten foot outside diameter, eight hearth furnace having a hearth area of 364 ft$^2$. The heat requirement for the multiple hearth furnace is 3500 B.T.U. for each pound of activated carbon regenerated.

The quench tank for receiving thermally regenerated activated carbon from the regeneration furnace has a capacity large enough to hold about 7,300 lbs. per hour of water and activated carbon. 84,000 lbs. per day water is recycled from the dewatering means to the quench tank, while 112,000 lbs. per day of makeup water is fed to the quench tank. 100 lbs. per hour makeup carbon is also added to the quench tank.

The dewatering means employed to remove water from the activated carbon prior to entry into the thermal regeneration furnace has a capacity of 6,900 lbs. per hour. From this, 3,500 pounds per hour of water will be recycled to the quench tank. 3,400 Pounds per hour of carbon containing 45% water that cannot be separated will be produced. At these capacities, the dewatering screen will handle the activated carbon content of one column in twelve hours. The carbon is discharged into the feed hopper of the multiple hearth furnace.

Transport of the activated carbon from each column to the dewatering screen is accomplished hydraulically. The spent activated carbon is dumped from the base of each column where it is picked up by a recycle water line and moved to the surge bin and then to the dewatering screen. The recycle water line is capable of handling a slurry amounting to slightly more than 965,000 lbs. per day. So as to avoid down time and to transport the slurry efficiently, it should preferably have a capacity of about 81,000 lbs. per hour so that the transfer can be effected in 12 hours.

Although only a few embodiments of the present invention have been described above, it should be appreciated that many modifications can be made without departing from the spirit and the scope of the present invention. For example, four, five or more beds of activated carbon can be employed with one, two or more of the beds undergoing regeneration simultaneously. Also, although it is preferred to drain and dry each activated carbon bed after the completion of solvent regeneration and adsorption, the draining and drying procedure is not mandatory. Further, although the liquids have been shown as flowing upwardly through the activated carbon bed and hot air flowing downwardly in the specific embodiment illustrated, other flow directions can be employed. Furthermore, adsorption and desorption can be accomplished at any temperature which will provide the desired adsorption and desorption activity.

Also, it should be appreciated that thermal regeneration can be accomplished less often than every third or fourth regeneration. If activated carbons and/or regenerating liquids are employed which are capable of regenerating the activated carbon to very near its original activity, then thermal regeneration can be accomplished less often. Depending on economics, however, thermal regeneration should be carried out when liquid regeneration is unable to raise the activity of the activated carbon above 50% of its original value.

Also it should be appreciated that distillation of the waste water passing out of the activated carbon beds is not essential to the present invention, although it is preferred.

All such modifications are intended to be included within the scope of the present invention, which is to be limited only by the following claims:

We claim:
1. A process for treating acrylonitrile waste water to facilitate disposal thereof and recover acrylonitrile and acrylic acid therefrom, said process comprising
   (1) adsorbing organics contained in said acrylonitrile waste water by passing said acrylonitrile waste water through first and second activated carbon beds arranged in series whereby the acrylonitrile waste water passing out of said second activated carbon bed has a reduced organics content,
   (2) thereafter liquid-regenerating said first activated carbon bed by passing a regenerating liquid having a boiling point higher than the organics in said acrylonitrile waste water through said first activated carbon bed to desorb the organics contained therein and thereby produce an organics-rich regenerating liquid, said organics-rich regenerating liquid being distilled to produce acrylonitrile and acrylic acid as distillate and regenerating liquid as distillation bottoms,
   (3) simultaneously with step (2), adsorbing organics from additional amounts of acrylonitrile waste water by passing additional amounts of acrylonitrile waste water in series through said second activated carbon bed and then through a third activated carbon bed,
   (4) thereafter, liquid-regenerating said second activated carbon bed by passing regenerating liquid through said second activated carbon bed to desorb the organics contained therein and thereby produce an organics-rich regenerating liquid, said organics-rich regenerating liquid being distilled to produce acrylonitrile and acrylic acid as distillate and regenerating liquid as distillation bottoms,
   (5) simultaneously with step (4) adsorbing organics from additional amounts of acrylonitrile waste water by passing acrylonitrile waste water in series through said third activated carbon bed and then through said first activated carbon bed,
   (6) repeating steps (1) to (5) until each of said activated carbon beds is liquid regenerated at least three times, and thereafter separately and in sequence thermally regenerating each of said three activated carbon beds by passing the activated carbon therein to a thermal regeneration furnace and heating the activated carbon to an elevated temperature sufficient to burn off the organics thereon.

2. The process of claim 1 wherein each activated carbon bed is liquid regenerated four times before being thermally regenerated.

3. The process of claim 2 wherein solids contained in said acrylonitrile waste water are removed therefrom prior to passage of said acrylonitrile waste water into said activated carbon beds.

4. The process of claim 3 wherein said regenerating liquid has a capacity to regenerate activated carbon to at least about 90% of its virgin activity based on the capacity of said activated carbon to adsorb $CCl_4$.

5. The process of claim 4 wherein said regenerating liquid is selected from the group consisting of isobutyric acid, dimethylformamide and dimethyl sulfoxide.

6. The process of claim 2 wherein regenerating liquid recovered as distillation bottoms from distillation of the organics rich regenerating liquid from each activated carbon bed is recycled for another pass through the activated bed being desorbed.

7. The process of claim 2 wherein waste water passing out of said activated carbon beds and substantially free of organics is distilled to produce water vapor and a concentrated solution of sulphate salts.

8. A process for treating acrylonitrile waste water to facilitate disposal thereof and recover of acrylonitrile and acrylic acid therefrom, said process comprising
   (1) contacting said acrylonitrile waste water with activated carbon to adsorb the organic components of said waste water thereon and produce acrylonitrile waste water having a reduced organics content,
   (2) liquid regenerating the activated carbon after the capacity of said activated carbon to adsorb organics drops below a predetermined value to thereby produce a desorbing liquid rich in organics, (3) distilling the organics-rich regenerating liquid produced in step (2) to separate acrylic acid and acrylonitrile from the regenerating liquid,
(4) repeating steps (1) to (3) in order until liquid regeneration of the activated carbon is unable to restore the activity of the activated carbon to a predetermined percentage of its virgin activity,
(5) thereafter contacting said activated carbon with additional amounts of acrylonitrile waste water to adsorb organics on said activated carbon, and then
(6) thermally regenerating said activated carbon.

9. The process of claim 8 wherein said predetermiend percentage is 50%.